United States Patent [19]

Okuwaki et al.

[11] Patent Number: 5,439,423
[45] Date of Patent: Aug. 8, 1995

[54] CHAIN BELT WHERE LOAD BLOCK HAS GROOVES FOR ENGAGEMENT WITH PROTRUSIONS ON LINK PLATES

[75] Inventors: Shigeru Okuwaki, Shizuoka; Yukio Tomimura, Mie, both of Japan

[73] Assignees: Borg-Warner Automotive, Inc., Sterling Heights, Mich.; Toyota Jidosha Kabushiki Kaisha, Aichi, Japan

[21] Appl. No.: 224,823

[22] Filed: Apr. 8, 1994

[30] Foreign Application Priority Data

Apr. 9, 1993 [JP] Japan .................................. 5-107517

[51] Int. Cl.6 .............................................. F16G 5/18
[52] U.S. Cl. .................................. 474/245; 474/242
[58] Field of Search ............... 474/242, 244, 245, 206, 474/214

[56] References Cited

U.S. PATENT DOCUMENTS

| | | |
|---|---|---|
| 1,840,081 | 1/1932 | Breer . |
| 4,580,999 | 4/1986 | Ledford ............... 474/245 X |
| 4,776,829 | 10/1988 | Yamamuro et al. ............ 474/240 |
| 4,871,344 | 10/1989 | Morisawa ................... 474/206 |
| 4,938,737 | 7/1990 | Yamamuro .................. 474/242 |
| 4,993,999 | 2/1994 | Mott ........................ 474/240 |
| 5,007,883 | 4/1991 | Cole et al. ............... 474/245 X |
| 5,026,332 | 6/1991 | Mott et al. ................. 474/242 |
| 5,061,226 | 10/1991 | Mott ........................ 474/244 |
| 5,090,948 | 2/1992 | Orth ........................ 474/245 |
| 5,131,892 | 7/1992 | Mott ........................ 474/240 |
| 5,147,250 | 9/1992 | Mott ..................... 474/214 X |
| 5,147,251 | 9/1992 | Cole ........................ 474/206 |
| 5,167,587 | 12/1992 | Mott ........................ 474/245 |
| 5,215,505 | 6/1993 | Sugimoto et al. ............ 474/242 |
| 5,263,903 | 11/1993 | Mott ..................... 474/214 X |
| 5,334,111 | 8/1994 | Cole et al. .............. 474/245 X |

FOREIGN PATENT DOCUMENTS

| | | |
|---|---|---|
| 61-17744 | 1/1986 | Japan . |
| 63-72941 | 4/1988 | Japan . |
| 1-169145 | 7/1989 | Japan . |
| 1-169146 | 7/1989 | Japan . |
| 1-115043 | 8/1989 | Japan . |
| 1-203733 | 8/1989 | Japan . |
| 1-136747 | 9/1989 | Japan . |
| 1-316544 | 12/1989 | Japan . |
| 2-62445 | 3/1990 | Japan . |
| 2-118230 | 5/1990 | Japan . |

*Primary Examiner*—Roger J. Schoeppel
*Attorney, Agent, or Firm*—Willian Brinks Hofer; Greg Dziegielewski; Hugh A. Abrams

[57] ABSTRACT

A power transmission chain belt wherein each of two mutually offset parallel chains includes connected sets of parallel links, and spaced-apart parallel load block members engage the inner side of the parallel chains. Each set of parallel links includes link plates each having a pair of gripping protrusions formed so as to extend from an inner-side end face facing the load block members. The protrusions engage a pair of engaging grooves formed on each load block member, to thereby hold the link plates. The grooves are open on the opposite end faces of the load block member, and are provided with stopper means for inhibiting relative movements of the link plates and the load block member.

16 Claims, 8 Drawing Sheets

CHAIN BELT WHERE LOAD BLOCK HAS GROOVES FOR ENGAGEMENT WITH PROTRUSIONS ON LINK PLATES

BACKGROUND OF THE INVENTION

1. Field of the Art

This invention relates to power transmission chains and, more particularly, to chains and chain belts used with continuously variable transmissions or variable-pulley transmissions.

2. Discussion of the Related Art

Chains or chain belts are conventionally utilized in power transmission applications, such as the transmission of power in automotive transmissions, engine timing applications, or industrial power transmission applications. Such chain-belts are also utilized in vehicle transmissions of the type known as variable-pulley or continuously variable transmissions (CVTs). A CVT typically includes a pair of pulleys of variable or adjustable effective diameter that are placed on a pair of spaced shafts. An endless chain or loop connects the pulleys to transmit power between the shafts.

One type of an endless chain belt placed across variable diameter pulleys for power transmission is one which has a first chain and a second chain, or a pair of chain portions, with a plurality of interleaved, long-plate shaped link plates connected by pins. The two chains are interconnected in a parallel, but longitudinally offset or phased relationship. Parallel belt blocks, also known as struts or load blocks, are placed at a predetermined interval or spacing along the length of the first and second chains for the transmission of load or power. The blocks are conventionally of a length almost equal to the total width of the two side-by-side chains. The blocks are pinch-pressed between the opposed surfaces of the V-shaped groove of each variable pulley and are associated alternately with the first and second chains.

An example of such a phased power transmission chain belt for a CVT is described in Laid-Open Publication JP-A-61-17744 (published in 1986) of unexamined Japanese Patent Application. In such a chain-belt, a pair of gripping protrusions are formed on the inner side (nearer to the bottom of the V-shaped groove of the pulley) of each link plate to retain the belt block in contact with the chain by gripping the outer-side end portion of the belt block. The tips of these protrusions are fitted into grooves formed in the parallel outer side surfaces of the belt block. The grooves are of a length that is shorter than the length of the belt block.

In the chain belt of the above type, the outer end portion of each belt block is press-fitted between the gripping protrusions of the link plates during the assembling of each chain. Accordingly, the gripping protrusions and belt blocks should deform elastically to permit the link plates to grip the outer-side end portions of the belt blocks, while the tips of the gripping protrusions are fitted into the grooves of the belt blocks. Therefore, the belt blocks and the link plates having the gripping protrusions should be formed of a material that permits them to be elastically deformable, which limits the stiffness or rigidity of the link plates and belt blocks. Accordingly, this decreases the overall strength and the ultimate power transmission capacity of the chain belt.

SUMMARY OF THE INVENTION

It is therefore an object of the present invention to provide a chain belt with improved power transmission capacity.

The above object may be achieved according to the principle of the present invention, which provides a power transmission chain belt engageable with pulleys each having a v-groove, comprising: (a) at least two chains arranged in side-by-side parallel relationship with each other, each of the at least two chains including a plurality of sets of parallel links, and pivot members for connecting the sets of parallel links, the two chains being offset from each other in a longitudinal direction thereof by a distance equal to a half of a pitch of the sets of parallel links; (b) a plurality of load block members arranged in spaced-apart parallel relationship with each other and engaging an inner side of the at least two chains, each of the load block members being oriented transversely to the at least two chains and having a length which substantially covers a total width of the at least two chains, wherein each of the plurality of sets of parallel links includes a plurality of link plates each of which has an inner-side end face on the inner side of the two chains, each link plate having a pair of gripping protrusions formed so as to extend from an intermediate portion of the inner-side end face thereof, and wherein each of the load block members has opposite end faces which define the length thereof, an outer edge on the side of the link plates, and a pair of engaging grooves formed along the length thereof and in parallel with the outer edge thereof, each of the engaging grooves being open at opposite ends thereof on the opposite end faces of the load block member, the gripping protrusions of each link plate engaging the pair of engaging grooves of the each load block member, thereby holding the each load block member, the chain belt further comprising (c) stopper means, associated with at least one of the pair of engaging grooves, for inhibiting relative movement between the link plates and the load block members.

In the power transmission chain belt of the present invention constructed as described above, each of the link plates of each set of parallel links has a pair of gripping protrusions formed so as to extend from the inner-side end face thereof on the inner side of the chain belt, while on the other hand each load block member has a pair of engaging grooves formed in parallel with the outer edge thereof on the outer side of the chain belt. Each engaging groove is open on the opposite end faces of the load block member, which end face define the length of the load block member oriented transversely to the chains. Further, at least one of the engaging grooves is provided with stopper means for inhibiting relative movements of the link plates and the load block members.

When the link plates and the load block members are assembled together to fabricate the chain belt, the link plates are attached to the load block members such that the pair of protrusions of the link plates are fitted into the corresponding engaging grooves formed on the load block members, through the opposite ends of the grooves open on the end faces of each load block member. The link plates may be easily positioned by moving the link plates with the protrusions sliding in the engaging grooves in the direction from one of the end faces of the load block member toward the other end face, namely, toward the stopper means. Thus, the assembling of the present chain belt does not require elastic deformation of the link plates and the load block members to press-fit the protrusions of the link plates into the engaging grooves. This means that the link plates and load block members need not be formed so as to permit elastic deformation, and can therefore be formed with a high degree of stiffness or rigidity that does not permit elastic deformation. The present arrangement results in a significant increase in the power transmission capacity of the chain belt. Further, the stopper means protect the link plates (parallel links) and the load block members against movements relative to each other.

The stopper means may be provided for both of the engaging grooves of the load block member. For instance, the stopper means takes the form of a partition wall which divides each engaging groove of the load block member into two sections. The partition wall may be formed by plastic deformation of the material near the groove.

Usually, one of the adjacent two sets of parallel links further includes two stopper plates which are disposed so as to sandwich the inner link plates.

The load block members may consist of two different types of load block members, namely, first and second load block members. In this case, these two different first and second load block members which engage each of the chains are arranged alternately in the longitudinal direction of the chains. Where the chain belt has two chains, namely, a first chain and a second chain, for example, the first and second load block members alternately arranged are associated with the link plates such that the gripping protrusions of the link plates of one of the first and second chains engage the engaging grooves of one of the first and second load block members which are adjacent to each other, while the gripping protrusions of the link plates of the other of the first and second chains engage the engaging grooves of the other of the adjacent first and second load block members. The first and second load block members may have different distances between one of the opposite end faces and the stopper means, so that different numbers of the link plates are disposed between the above-indicated one end face and the stopper means.

Each link plate may have a pair of pin-fitting apertures which are spaced apart from each other in a direction along a length thereof parallel to the longitudinal direction of the chains. In this case, the pivot members are inserted through the pin-fitting apertures of the link plates of adjacent sets of the plurality of sets of parallel links, whereby the adjacent sets are connected to each other by the pivot members. Each pivot member may consist of a first pin and a second pin which engage with each other. In this instance, the first and second pins may have facing arcuate contacting surfaces one of which rocks on the other.

For easy manufacture of the load block members, each load block member preferably has a constant height over an entirety of the length thereof.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

One embodiment of this invention will be explained below in detail, by reference to the accompanying drawings.

Figure 2:
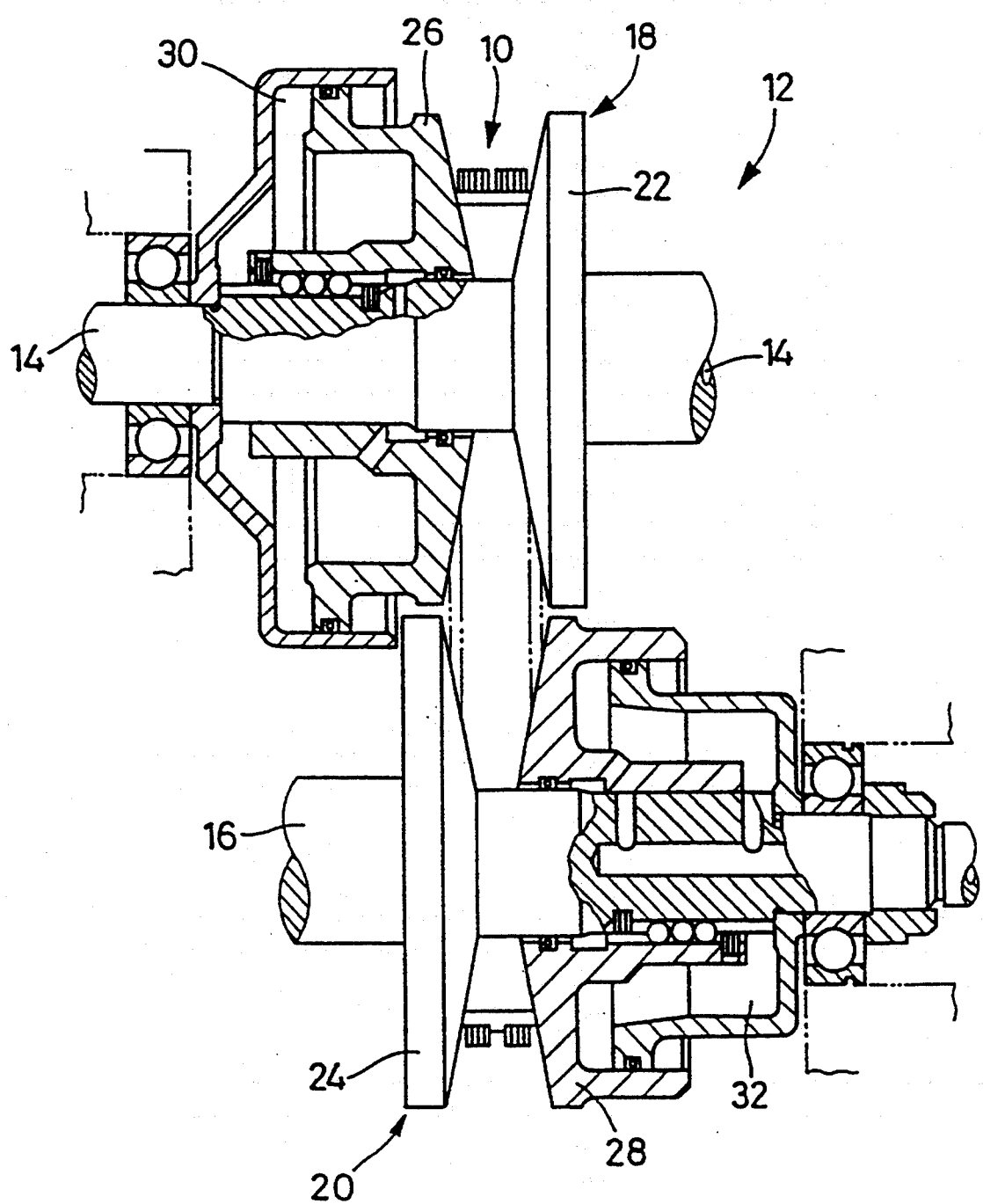
FIG. 2 is a schematic view illustrating the components of a continuously variable transmission having a chain belt constructed according to one embodiment of the present invention.

In the drawings, FIG. 2 shows a belt-and-pulley type stepless speed changer or continuously variable transmission (CVT) 12 for vehicles, equipped with a chain belt 10 which embodies the present invention. In FIG. 2, belt-and-pulley type stepless speed changer 12 has an input shaft 14 that is parallel to an output shaft 16. A pair of variable-diameter pulleys 18, 20 are provided on the respective input and output shafts 18, 20. The first pulley 18 is located on the primary side, that is, mounted on the input shaft 14, and the second pulley 20 is located on the secondary side, that is, mounted on the output shaft 16. The effective diameters of the pulleys 18, 20 are variable to allow adjustment of the speed ratio and the tension of the belt. The chain-belt 10 is placed across these variable-diameter pulleys 18 and 20 for power transmission through the chain-belt 10.

The primary or input-side pulley 18 includes a primary fixed rotor 22, which is fixed to the input shaft 14, and a primary movable rotor 26, which is movable in the axial direction on the input shaft 14. Similarly, the secondary variable-diameter pulley 20 includes a secondary fixed rotor 24, which is fixed to the output shaft 16, and a secondary movable rotor 28, which is slidable on the output shaft 16. The fixed and movable rotors of each pulley 18, 20 form a V-groove for the chain belt 10. To the primary and secondary movable rotors 26 and 28, thrust forces of a primary hydraulic actuator 30 and a secondary hydraulic actuator 32 are applied, respectively, so that the speed ratio of the belt-and-pulley type stepless speed changer or CVT 12 is changed continuously with these thrust forces being regulated by suitable control valve means well known in the art.

Figure 1:
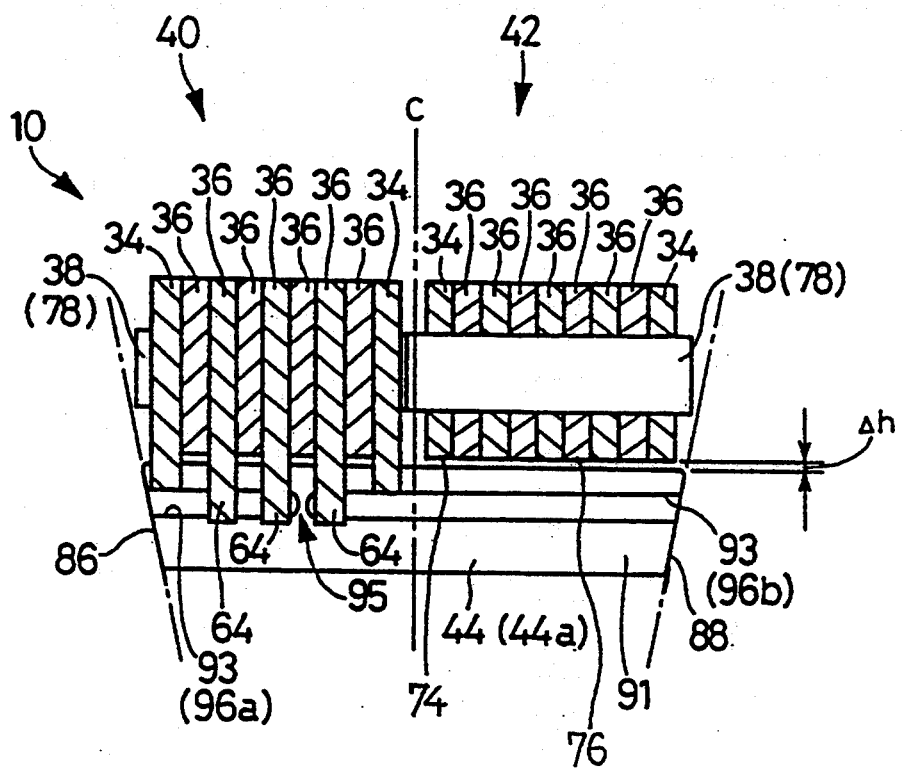
FIG. 1 is a sectional view taken along line 1—1 of FIG. 3.
Figure 3:
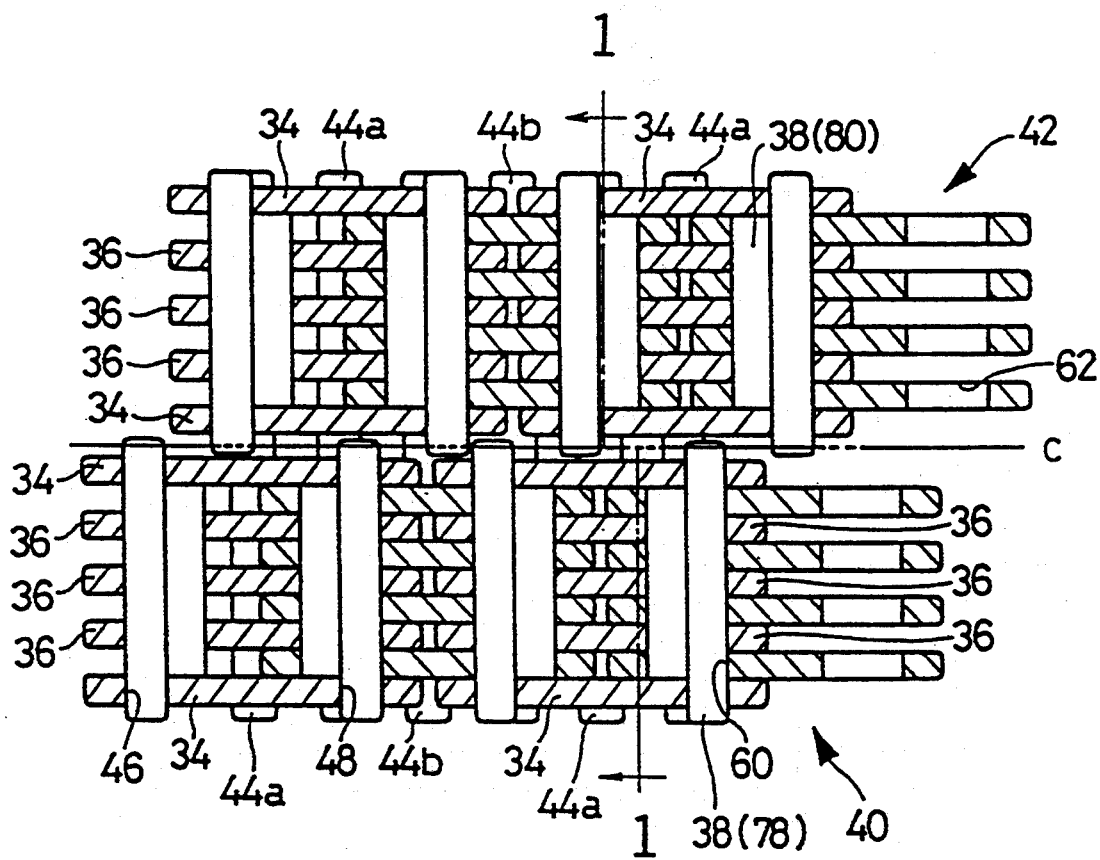
FIG. 3 is a sectional plan view of the chain-belt of FIG. 1 illustrating the links along a portion of first and second chains.

The chain belt 10 comprises a first chain 40 and a second chain 42, which are parallel to each other, and which are offset longitudinally by approximately one-half pitch, as shown in FIGS. 1 and 3. The chains 40, 42 are formed of interleaved links that are placed in side-by-side relation. A set of links is formed by two parallel stopper plates 34 and three link plates 36 that are positioned between the stopper plates 34. Such a set is interleaved with an adjacent set of links formed by four mutually parallel link plates 36. The sets of links are interleaved by the insertion of one end of each link plate between the stopper plates 34. The link plates 36 and stopper plates 34 are connected in the longitudinal direction by pivot members in the form of rocker pins 38 and thereby formed into a single endless chain unit 40, 42.

Figure 4:
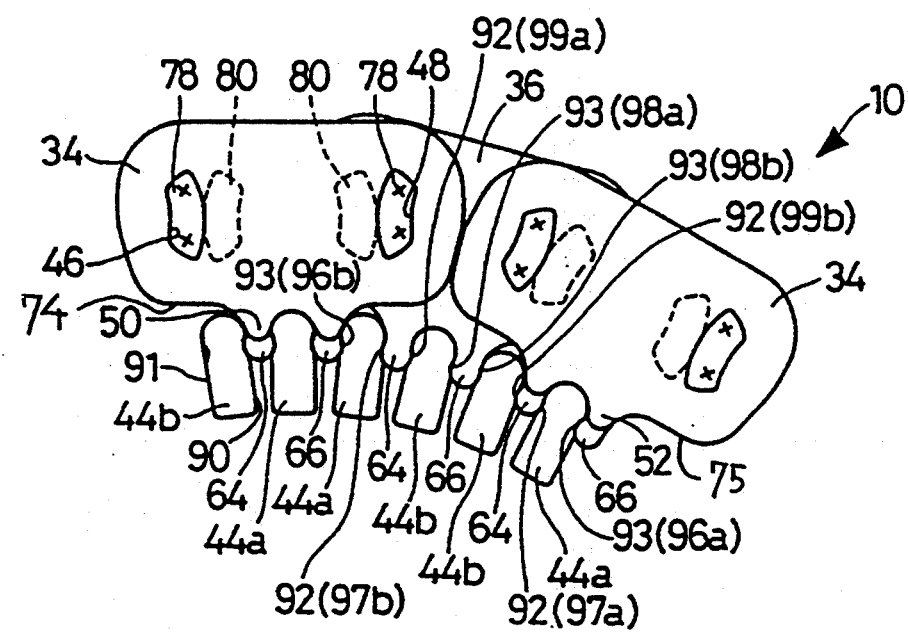
FIG. 4 is a side elevational view of one portion of the chain-belt shown in FIG. 1.

Load block members in the form of belt blocks are attached alternately to the inner side of the first chain 40 and the second chain 4, while being spaced apart from each other at a preset interval and parallel with the transverse or width direction of the first and second chains 40 and 42. FIGS. 1 and 3 show the belt blocks 44 connected to the chains 40, 42 so as to extend along respective straight lines parallel to the direction of width of the chains, and FIG. 4 shows the belt blocks 44 connected to the chains 40, 42 such that the belt blocks 44 are arranged along an arc of the bottom wall of the V-groove of the pulley 18 or 20. Also, in the cross-sectional view of FIG. 1, the rocker pin 38 of the second chain 42 is shown in its entirety. One-dot chain line in FIG. 1 indicates the opposed inner wall surfaces of the V-groove of the pulley, and two-dot chain line C in the same figure indicates the center line of the chain belt 10.

Figure 5:
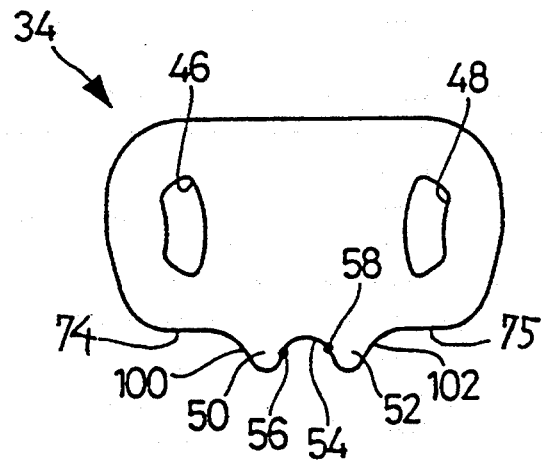
FIG. 5 is a side elevational view of a stopper plate used in the chain-belt of FIG. 1.

Each of the stopper plates 34 is a generally elongate rectangular plate as shown in FIG. 5. The stopper plate 34 has one pair of arc-shaped or arcuate pin-fitting apertures or holes 46 and 48 formed at the respective opposite end portions thereof and one pair of engaging protrusions 50 and 52 formed so as to extend from an inner peripheral side or inner-side end face thereof (i.e., on a lower end face as shown in FIG. 5 on the inner side nearer to the bottom of the V-groove of the pulley 18, 20). The protrusions 50, 52 extend with a preset mutual spacing therebetween and are positioned at a longitudinally intermediate part between the pin-fitting holes 46 and 48. The protrusions 50, 52 extend from the outer side toward the inner side of the chain belt 10. The stopper plate 34 includes an engaging concave part 54 that receives the outer end of the belt block 44. The concave part 54 is formed between the pair of engaging protrusions 50 and 52 and is adapted to contact with the outer edge or outer-side face of the belt block 44 at a pair of contact points 56 and 58, which are indicated by the black dots in FIG. 5.

Figure 6:
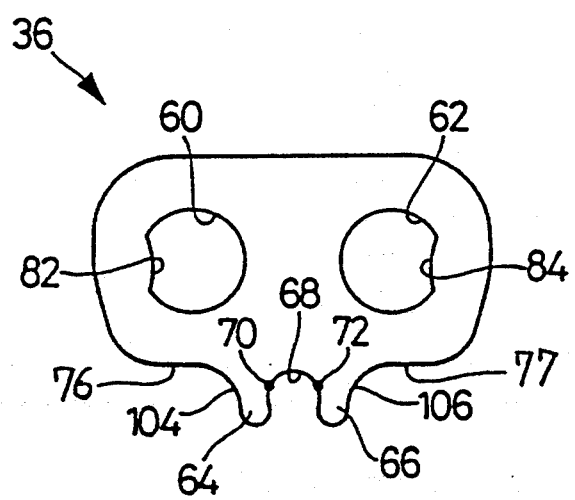
FIG. 6 is a side elevational view of a link plate used in the chain-belt of FIG. 1.

Each of the link plates 36, which is shown in FIG. 6 has nearly the same rectangular plate shape as the stopper plate 34. The link plate 36 has one pair of generally circular pin-fitting apertures or holes 60 and 62, which are formed at the opposite end portions. The link plate 36 also includes a pair of gripping protrusions 64 and 66 that are formed with a preset mutual spacing therebetween so as to extend from an inner peripheral side or inner-side end face thereof (i.e., formed on a lower end face nearer to the bottom of the V-groove of the pulley). These gripping protrusions 64, 66 are positioned at a longitudinally intermediate part of the link plate 36, between the pin-fitting holes 60 and 62. The protrusions 64, 66 extend from the outer side toward the inner side of the chain belt 10. The pair of gripping protrusions 64 and 66 extend a further distance from the tips of the engaging protrusions 50 and 52 of the stopper plate 34 and are spaced apart from each other by a distance smaller than that of the protrusions 50, 52. Like the engaging protrusions 50 and 52, the gripping protrusions 64, 66 define therebetween an engaging concave part 68 that receives the belt block 44 and has a pair of contact areas or contact points 70 and 72, which are indicated by the black dots in FIG. 6. The engaging concave part 68 is shaped for abutting contact with the outer edge or outer-side face of the belt block 44.

As shown in FIGS. 5 and 6, the engaging concave parts 54 and 68 formed at the inner-side end face of the stopper plate 34 and link plate 36 are located a certain distance on the inner side of the chains 40, 42, than surface regions 74 and 75, or 76 and 77, which are positioned on the side of the protrusions 50, 52 or 64, 66 which is remote from the engaging concave parts 54 or 68. In other words, the bottoms of the concave parts 54 and 68 are spaced a predetermined distance from the surface regions 74, 75, or 76, 77 in the direction of extension of the protrusions 50, 52, 64, 66. Therefore, when the chain belt 10 is assembled with the belt blocks 44 being arranged to extend parallel with each other in the direction of width of the chain belt 10 as shown in FIGS. 1 and 3, a gap or clearance Δh is left between the surface regions 74 and 75 or 76 and 77 of the stopper and link plates 34, 36 of one of the first and second chains 40, 42, and the top or outer edges of the belt blocks 44. FIG. 1 shows the gap Δh formed between the surface regions 74, 76 of the stopper plates 34 and link plates 36 and the belt block 44.

The certain distance of offset of the concave parts 54, 68 with respect to the surface regions 74, 75, 76, 77 is set so as to substantially prevent a contact between the stopper plate and link plates 34 and 36 and the belt block 44, which would occur due to relative radial movements of the first chain 40 and second chain 42 in the radial direction of the pulley 18 or 20 when the plates 34, 36 come into engagement with V-groove of the pulley 18 or 20 or leave the V-groove. In the present embodiment, the distance of offset or gap Δh is set to approximately 0.3 mm when the pitch of the first and second chains 40, 42 is 8 mm and the engagement radius of the chain belt 10 is 30 mm.

Figure 7:
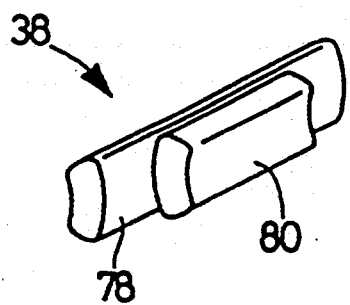
FIG. 7 is a perspective view of a rocker pin used in the chain-belt of FIG. 1.

The apertures or pin-fitting holes 60 and 62 of the link plate 36 have respective convex rotation stoppers 82 and 84 formed relatively adjacent to the respective longitudinally opposite ends of the link plate 36, as shown in FIG. 6. As shown in FIG. 7, the rocker pin 38 consists of an arcuate pin 78 and a second arcuate pin 80, each of which has an arcuate cross sectional shape. Each rotation stopper 82, 84 is adapted to engage the arcuate surface of the second arcuate pin 80, to thereby prevent rotation of the arcuate pin 80 within the pin-fitting hole 60, 62, while permitting the second arcuate pin 78 to roll on the first arcuate pin 80 during rotation of the belt 10.

The rocker pin 38 rotatably connects the stopper plates 34 and the link plates 36. As shown in FIG. 7, the pair of first arcuate pin 78 and second arcuate pin 80 have arcuate surfaces in rolling contact with each other. The length of the first arcuate pin 78 is larger by a predetermined amount than the total thickness of the two stopper plates 34 and the seven link plates 36. The length of the second arcuate pin 80 is nearly the same as the total thickness of the seven link plates 36. When the first and second chains 40, 42 are assembled, the first arcuate pin 78 and second arcuate pin 80 extend through the pin-fitting holes 60 and 62 of the seven link plates 36, while only the first arcuate pin 78 extend through the apertures 46, 48 of the two outer stopper plates 34, which are positioned so as to sandwich the seven inner link plates 36. The first and second arcuate pins 78 and 80 roll on each other at their mutually contacting surfaces as the sets of stopper and link plates 34, 36 are moved along the curvatures of the pulleys 18, 20 at the opposite ends of the loop of the chain belt 10 when the chain belt is rotated with the pulleys 18, 20.

Figure 8:
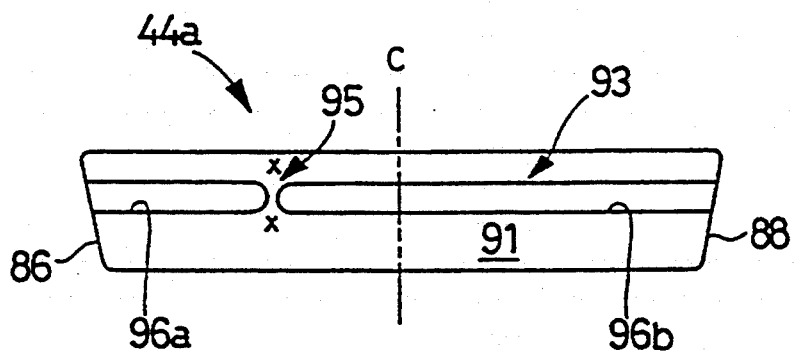
FIG. 8 is a front view of a first belt block shown in FIG. 1.
Figure 9:
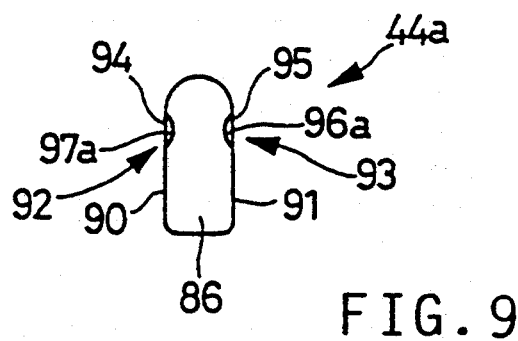
FIG. 9 is an end elevational view of the first belt block of FIG. 8.
Figure 10:
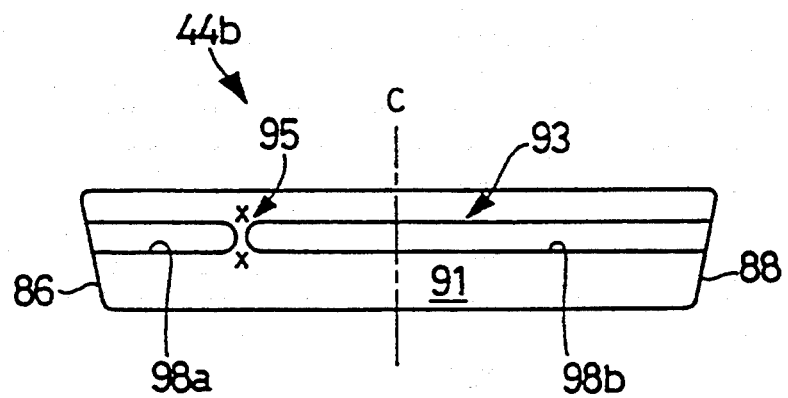
FIG. 10 is a front view of a second belt block shown in FIGS. 2 and 3.
Figure 11:
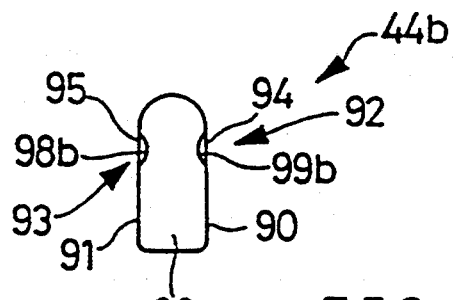
FIG. 11 is an end elevational view of the second belt block of FIG. 10.

Two preferred types of the belt block 44 are shown in FIGS. 8 and 9 as first belt block 44a, and in FIGS. 10 and 11 as second belt block 44b, respectively. The first belt block 44a is a generally elongate member having a constant height over its entire length parallel to the transverse direction of the chain belt 10. The first belt block 44a has one pair of tapered end faces 86 and 88 that frictionally engage with the opposed inner wall surfaces of the V-grooves of the variable-diameter pulleys 18 and 20. The tapered end faces 86, 88 correspond to the longitudinally opposite ends of the block 44a and define the length of the block 44a.

Engaging grooves 92 and 93 are formed in opposed front and back side surfaces 90 and 91 of each first belt block 44a, as shown in FIG. 9. The grooves 92, 93 are formed so as to extend in the longitudinal direction of the block 44a, which is transverse to the direction of extension of the chain belt 10, and has an arcuate cross sectional shape as shown in FIG. 9. The grooves 92, 93 are open at their ends on the tapered end faces 86 and 88, as indicated in FIG. 8. The engaging grooves 92 and 93 are each divided by a stopper 94, 95 into a first engaging groove 96a, 97a and a second engaging groove 96b, 97b. The stoppers 94, 95 are located on one of opposite sides of the centerline C (FIG. 8) which is nearer to the tapered end face 86.

The first engaging grooves 96a and 97a formed on the side of the tapered end face 86 are longer than the total thickness of one stopper plate 34 and four link plates 36 by a predetermined distance. The portion of the second engaging grooves 96b and 97b that is between the centerline c and the stoppers 94 and 95 is longer than the total thickness of one stopper plate 34 and two link plates 36 by a predetermined distance. The stoppers 94 and 95 are formed by plastic deformation of the block 44a at two locations, indicated by marks x in FIG. 8, on the opposite sides of the groove 92, 93, for example, by caulking to cause flows of the materials at those locations in proximity to the edges of the groove 92, 93 toward the grooves 92, 93 in the direction parallel to the centerline C, so as to fill an appropriate portion of the groove 92, 93. In other words, the filled portion of the groove 92, 93 serves as a partition 94, 95 dividing the groove 92, 93 into the first engaging grooves 96a, 97a, 98a, 99a, and the second engaging grooves 96b, 97b, 98b, 99b. The stoppers 94, 95 prevent relative movements between the link plates 36 and belt block 44 in the transverse direction of the chain belt 10, and limit movements of the first chain 40 and second chain 42 toward each other.

The second belt block 44b, which is shown in detail in FIGS. 10 and 11, differs from the first belt block 44a only in that first engaging grooves 98a and 99a of the second belt block 44b are longer by a given amount than the total thickness of one stopper plate 34 and three link plates 36, and the length of second engaging grooves 98b, 99b between stoppers 94 and 95 and the centerline C is larger by a given amount than the total thickness of one stopper plate 34 and three link plates 36. In the other aspects, the second belt block 44b is identical with the first belt block 44a. In FIGS. 10 and 11, the same reference numerals as used in FIGS. 8 and 9 are used to identify the corresponding elements.

Figure 12:
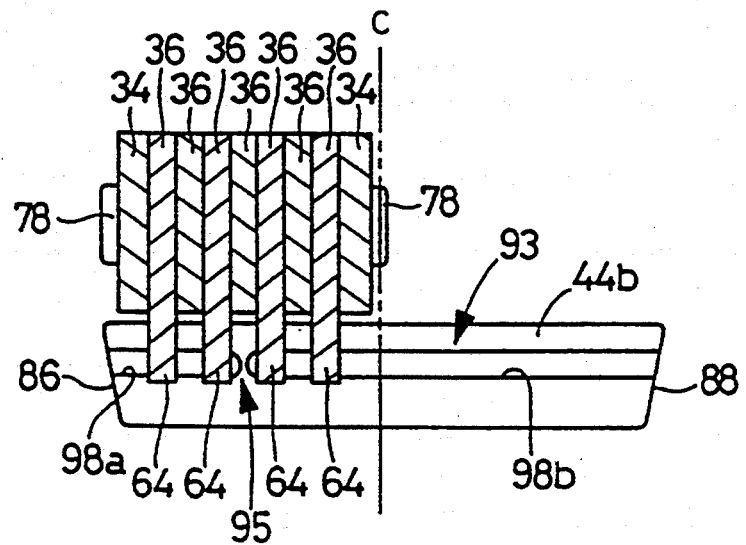
FIG. 12 is a front view of the second belt block illustrating a portion of the chain-belt and the placement of the gripping protrusions of the link plates and stopper plates into the engaging groove of the belt block.

When the chain belt 10 is assembled, the load blocks or belt blocks 44 are placed in parallel with each other at preset intervals along the length of the first and second chains 40, 42 such that each belt block 44 extends in the direction of width of the first and second chains 40, 42. The first and second belt blocks 44a, 44b are arranged alternately along the first and second chains 40, 42 such that the first engaging grooves 96a, 97a of the first belt blocks 44a are opposed to the first engaging grooves 98a, 99a of the adjacent second belt blocks 44b. For instance, the first belt block 44a shown in FIG. 1 are engaged with the stopper and link plates 34, 36 of the first chain 40, but are spaced apart from the second chain 42 with the gap Δh left between the outer edge or outer-side face of the first belt block 44a and the surface regions 74, 75, 76, 77 of the plats 34, 36 as explained above. Further, the first belt block 44a shown in FIG. 1 is associated with the three link plates 36 of one of two adjacent sets of parallel links 34, 36, while the second belt block 44b adjacent to the first belt block 44a is associated with the four link plates 36 of the other of the two adjacent sets of parallel links 34, 36, as indicated in FIG. 12. Thus, the adjacent first and second belt blocks 44a, 44b are associated with a total of seven link plates 36 of the first chain 40, as indicated in FIGS. 1 and 12. This arrangement is also true for the second chain 42.

Described more specifically, the tips of the gripping protrusions 64, 66 of the two link plates 36 of one (first set) of the two adjacent sets of parallel links 34, 36 are brought into engagement with the first engaging grooves 96a, 97a of the first belt block 44a, as shown in FIG. 1, while the tips of the gripping protrusions 64, 66 of the two link plates 36 of the other (second set) of the two adjacent sets are brought into engagement with the first engaging grooves 98a, 99a of the second belt block 44b, as shown in FIG. 12. For engagement of these four link plates 36 with the first engaging grooves 96a, 97a, 98a, 99a, the link plates 36 are moved in the direction from the tapered end face 86 toward the stoppers 94, 95. Then, the tips of the gripping protrusions 64, 66 of the one link plate 36 of the first set are brought into engagement with the second engaging grooves 96b, 97b of the first belt block 44a, as shown in FIG. 1, while the tips of the gripping protrusions 64, 66 of the two link plates 36 of the second set are brought into engagement with the second engaging grooves 98b, 99b of the second belt block 44b, as shown in FIG. 12. At this time, these three link plates 36 are moved in the direction from the end face 88 toward the stoppers 94, 95. Thus, the total of seven link plates 36 are engaged with the adjacent first and second belt blocks 44a, 44b. Then, the second arcuate pins 80 are inserted through the pin-fitting holes 60, 62 of the seven link plates 36.

Subsequently, the two stopper plates 34 are attached to the first belt block 44a such that the engaging concave parts 54 of the stopper plates 34 engage the outer-side face of the block 44a and such that the stopper plates 34 sandwich the seven inner link plates 36 as indicated in FIG. 1. Then, the first arcuate pins 78 are inserted through the pin-fitting holes 60, 62 of the seven link plates 36 and through the pin-fitting holes 46, 48 of the two stopper plates 34, such that the first arcuate pins 78 contact the corresponding second arcuate pins 80, as indicated in FIG. 7. Thus, the first chain 40 is assembled. Similarly, the second chain 42 including the alternately arranged first and second belt blocks 44a, 44b can be assembled. The opposite end portions of the first arcuate pins 78 which project a short distance from the stopper plates 34 are caulked against the outer surfaces of the stopper plates 34. The first and second belt blocks 44a, 44b are attached to the inner side of the first or second chain 40, 42, such that the gripping protrusions 64, 66 of the three link plates 36 engage the portion of the first belt block 44a between the centerline C and the end face 86, as indicated in FIG. 1, while the gripping protrusions 64, 66 of the four link plates 36 engage the portion of the second belt block 44b between the centerline C and the end face 86. The first and second chains 40, 42 assembled as described above are positioned side by side relative to each other such that the two chains 40, 42 are offset from each other in the direction perpendicular to the belt blocks 44, by a distance equal to a half of the pitch of the chains 40, 42 (at which the first and second belt blocks 44 are alternately arranged along the chain 40, 42), and such that the first and second belt blocks 44a, 44b are alternately arranged. In the manner described above, the chain belt 10 including the first and second chains 40, 42 as shown in FIGS. 1, 3 and 4 is fabricated.

The outer-side end portion of the belt blocks 44a and 44b, which is on the radially outer side of the chain belt 10, is rounded so as to have an arcuate shape in cross section as shown in FIGS. 4, 9 and 11, which arcuate shape follows the arc of the engaging concave part 68 of the link plate 36. This configuration of the belt blocks 44a, 44b prevents an otherwise possible drawback that the belt block 44 which is engaged with the stopper and link plates 34, 36 of one of the first and second chains 40, 42 interferes with outer surface areas 100, 102, 104, 106 of the stopper and link plates 34, 36 of the other of the first and second chains 40, 42. The outer surface areas 100 and 102 partially define the engaging protrusions 50, 52 of the stopper plate 34 and are located remote from the engaging concave part 54, as shown in FIG. 5. The outer surface areas 104 and 106 partially define the gripping protrusions 64, 66 of the link plate 36 and are located remote from the engaging concave part 68, as shown in FIG. 6.

Thus, in this embodiment of the chain belt 10, the link plates 36 and belt blocks 44 are assembled together such that the tips of the gripping protrusions 64 and 66 are fitted into the engaging grooves 92 and 93 that are open on the tapered end faces 86 and 88 of each belt block 44, with the link plates 36 being moved in the directions from the end faces 86, 88 toward the stoppers 94, 95. Accordingly, each link plate 36 can be moved to a preset position along the engaging grooves 92 and 93. Therefore, press-fitting of the gripping protrusions 64 and 66 on the belt blocks 44 through elastic deformation of the link plates 36 is unnecessary for attaching the belt blocks 44 onto the link plates 36. Thus, the gripping protrusions 64 and 66 and the belt blocks 44 can be formed with a high degree of stiffness that prevents elastic deformation, whereby the power transmission capacity of the chain belt 10 can be increased.

Also, according to this embodiment, the gripping protrusions 64 and 66 of the link plates 36 can be fitted into the engaging grooves 92 and 93 open on the opposite tapered end faces 86 and 88 of each belt block 44. Therefore, the assembling of the belt blocks 44 onto the first and second chains 40, 42 is simplified and the manufacturing cost of the chain belt 10 is reduced.

Also, according to this embodiment, each belt block 44 has a constant height throughout its entire length. Thus, the belt blocks 44 can be easily manufactured. For example, the belt blocks 44 can be formed of a metallic material by: preparing a blank in the form of a bar by drawing using a die which has a hole whose cross sectional shape is identical with that of the belt block 44 taken along the centerline C indicated in FIG. 8, the drawing being effected with the metallic material forced against the die under pressure; cutting the prepared bar-like blank into pieces by using a press; and performing a calking or other operation on each of the obtained pieces (corresponding to the blocks 44), to form the stoppers 94, 95. Accordingly, contrary to a chain belt provided with belt blocks which has different height dimensions, the present chain belt 10 does not require certain machining processes such as cutting operations to establish different heights on the belt block, so that the manufacture of the belt blocks is facilitated and the cost of the chain belt is further reduced. Incidentally, different materials are used for the belt blocks 44 and the link plates 36 for different required hardness levels. Accordingly, heat treatments, such as quenching and annealing, to increase the rigidity of the belt blocks 44 need to be performed prior to the assembling of the chain belt 10. In this embodiment, an operation to form the stoppers 94, 95 by plastic deformation of the material of the belt block 44 is carried out prior to the heat treatment of the belt block 44 and in advance of the assembling of the chain belt. Therefore, the operation to form the stoppers 94, 95 can be carried out easily when the material of the belt block 44 has a low hardness value.

Also, according to this embodiment, the height of the belt blocks 44 is constant in the longitudinal direction. Therefore, as compared with the conventional chain belt provided with belt blocks each having a rectangular frame structure at one end portion thereof as disclosed in Laid-Open Publication JP-A-2-118230 (published in 1990) of unexamined Japanese Patent Application, the present embodiment is adapted to prevent concentration of stresses on local portions of the belt block during power transmission by the chain belt, thereby enhancing the endurance strength of the belt block.

Also, according to this embodiment, a certain gap or clearance is provided between the inner side surface regions 74, 65, 76, 77 of the stopper plate 34 and link plate 36 and the outer-side edges or faces of the belt block 44 to allow relative motion between the first and second chains 40, 42 in the radial direction of the pulleys 18, 20. Therefore, the belt blocks can be formed with a constant height over the entire length, and the present belt blocks have higher endurance strength, than the belt blocks which have different height dimensions to allow the radial relative movements of the first and second chains 40, 42.

Also, according to this embodiment, the height of the belt blocks is held constant in the longitudinal direction and the blocks are attached to the inner side of the first chain 40 and second chain 42, in contrast to the chain belt of the prior art in which the chain extends through the through-holes formed through the rectangular frame structure of the belt blocks as disclosed in the above-indicated Publication JP-A-2-118230. Accordingly, in the chain belt of the present embodiment, the number of the link plates to be arranged in the direction of width of the chain is not limited by the width of such through-holes as provided in the prior art. Therefore, the number of link plates in the width direction of the chains 40 and 42 can be increased for higher tensile strength of the chains 40 and 42.

Also, according to this embodiment, the outer edge or outer-side end portion of the belt block 44 is arc-shaped in cross section as seen in FIGS. 9 and 11. Therefore, enlargement of the widths of the engaging protrusions 50 and 52 of the stopper plate 34 and the gripping protrusions 64 and 66 of the link plate 36 does not cause interference between the belt block 44 (more precisely, the outer-side face of the belt block) and the engaging protrusions 50 and 52 and gripping protrusions 64 and 66 (more precisely, outer surface areas 100, 102, 103, 106). Accordingly, the widths of the engaging and gripping protrusions 50, 52, 64, 66 may be appropriately sized to ensure the required strength of the protrusions 50, 52, 64 and 66.

Also, according to the present embodiment, the chain belt 10 can be assembled by simply combining together the first chain 40 associated with an array of the belt blocks 44, and the second chain 42 associated with another array of the belt blocks 44. Thus, the assembling of the chain belt 10 is simplified.

While this invention has been described above in its presently preferred embodiment by reference to the accompanying drawings, it is to be understood that the present invention may be otherwise.embodied.

For example, while the stoppers 94, 95 are formed by plastic deformation as effected by caulking in the illustrated embodiment, other operations such as welding to fill portions of the grooves 92, 93 may be used to form the stoppers.

In the above embodiment, the positions of the stoppers 94 and 95 in the longitudinal direction. of the engaging grooves 92 and 93 are determined so that the length of the first engaging grooves 96a and 97a is larger by a predetermined amount than the total thickness of one stopper plate 34 and three or four link plates 36. However, the length of the first engaging groove may be determined so that it is larger by a predetermined amount than the total thickness of one stopper plate 34 and two link plates 36. In essence, the stoppers should be located so as to inhibit the relative movement between the link plates 36 and the belt block 44.

In the above embodiment, the outer-side edge of the belt block 44 has an arcuate cross sectional shape. However, the present invention may be practiced with the belt block 44 having such arcuate outer edge profile only in the half portion between the centerline C and the tapered end face 86, which half portion engages the concave parts 68 of the link plates 36. Of course, this invention can also be practiced with the belt block 44 having a substantially rectangular outer edge profile over the entire length.

While the rocker pin 38 in the above embodiment consists of the first arcuate pin 78 and the second arcuate pin 80, a single cylindrical pin may be used as the rocker pin.

While the two stoppers 94, 95 are provided for the two engaging grooves 92 and 93 of the belt block 44 in the illustrated embodiment, only one of the stoppers 94, 95 may be provided for the corresponding one of the grooves 92, 93.

It is to be understood that various other modifications or changes can be made in this invention, without departing the spirit and scope of the invention defined in the following claims.

What is claimed is:

1. A power transmission chain belt engageable with pulleys each having a V-groove, comprising:

at least two chains arranged in side-by-side parallel relationship with each other, each of said two chains including a plurality of sets of parallel links, and pivot members, said sets of parallel links being connected to each other by said pivot members, said two chains being offset from each other in a longitudinal direction thereof by a distance equal to a half of a pitch of said sets of parallel links;

a plurality of load block members arranged in spaced-apart parallel relationship with each other and engaging an inner side of said two chains, each of said load block members being oriented transversely to said two chains and having a length which substantially covers a total width of said two chains;

each of said plurality of sets of parallel links including a plurality of link plates each of which has an inner-side end face facing said load block members, and a pair of gripping protrusions formed so as to extend from an intermediate portion of said inner-side end face thereof;

each of said load block members having opposite end faces which define said length thereof, an outer edge on the side of said load block member, and a pair of engaging grooves formed along said length thereof and in parallel with said outer edge thereof, each of said pair of engaging grooves being open at opposite ends thereof on said opposite end faces, said pair of gripping protrusions on each of said link plates engaging said pair of engaging grooves of said each load block member thereby holding each load block member; and stopper means, provided in at least one of said pair of engaging grooves, for inhibiting relative movement between said link plates and said load block members.

2. A power transmission chain belt according to claim 1, wherein said stopper means is provided for both of said pair of engaging grooves.

3. A power transmission chain belt according to claim 2, wherein said stopper means consists of a partition wall which divides each of said engaging grooves into two sections.

4. A power transmission chain belt according to claim 1, wherein one of adjacent sets of said plurality of sets of parallel links further includes two stopper plates which are disposed so as to sandwich said plurality of link plates.

5. A power transmission chain belt according to claim 1, wherein said plurality of load block members consist of a plurality of first load block members and a plurality of second load block members, said first and second load block members which engage each of said at least two chains being arranged alternately in the longitudinal direction of said at least two chains.

6. A power transmission chain belt according to claim 5, wherein said at least two chains consist of a first chain and a second chain, and wherein said gripping protrusions of said link plates of one of said first and second chains engage said engaging grooves of one of said first and second load block members which are adjacent to each other, while said gripping protrusions of said link plates of the other of said first and second chains engage said engaging grooves of the other of said adjacent first and second load block members.

7. A power transmission chain belt according to claim 5, wherein said first and second load block members have different distances between one of said opposite end faces and said stopper means.

8. A power transmission chain belt according to claim 1, wherein each of said link plates has a pair of pin-fitting apertures which are spaced apart from each other in a direction along a length thereof parallel to said longitudinal direction of the chains, said pivot members extending through said pin-fitting apertures of the link plates of adjacent sets of said plurality of sets of parallel links, whereby said adjacent sets are connected to each other by said pivot members.

9. A power transmission chain belt according to claim 1, wherein each of said pivot members consist of a first pin and a second pin which engage with each other.

10. A power transmission chain belt according to claim 9, wherein said first and second pins have facing arcuate contacting surfaces one of which rocks on the other.

11. A power transmission chain belt according to claim 1, wherein each of said plurality of load block members has a constant height over an entirety of said length thereof.

12. A power transmission chain belt according to claim 1, wherein a portion of an outer surface comprising said outer edge of each of said plurality of load blocks has an arcuate shape and another portion follows a concave part formed along the length of said load block for engagement of said pair of gripping protrusions provided on said each link plate.

13. A power transmission chain belt engageable with pulleys each having a V-groove, comprising:
- at least two chains arranged in side-by-side parallel relationship with each other, each of said two chains including a plurality of sets of parallel links and pivot members, said sets of parallel links being connected to each other by said pivot members, said two chains being offset from each other in a longitudinal direction thereof by a distance equal to a half of a pitch of said sets of parallel links;
- a plurality of load block members arranged in spacedapart parallel relationship with each other and engaging an inner side of said two chains, each of said load block members being oriented transversely to said two chains and having a length which substantially covers a total width of said two chains;
- each of said plurality of sets of parallel links including a plurality of link plates each of which has an inner-side end face facing said load block members, and a pair of gripping protrusions formed so as to extend from an intermediate portion of said inner-side end face thereof;
- each of said load block members having opposite end faces which define said length thereof, an outer edge on the side of said load block member, and a pair of engaging grooves formed along said length thereof and in parallel with said outer edge thereof, each of said pair of engaging grooves being open at opposite ends thereof on said opposite end faces, the pair of gripping protrusions on each of said link plates of said each set of parallel links engaging the pair of engaging grooves of a corresponding one of said load block members; and
- a partition wall, provided in at least one of said pair of engaging grooves of said corresponding one load block member, for inhibiting relative movement between said link plates of said each set of parallel links and said corresponding one load block member, said partition wall dividing said one engaging groove into two sections.

14. A power transmission chain belt according to claim 13, wherein said partition wall includes a portion thereof formed by deforming a portion of said corresponding one load block member at an intermediate location of said one engaging groove.

15. A power transmission chain belt according to claim 14, wherein said partition wall includes a portion thereof formed by caulking a portion of said corresponding one load block member at an intermediate location of said one engaging groove.

16. A power transmission chain belt according to claim 14, wherein said partition wall includes a portion thereof formed by welding a portion of said corresponding one load block member at an intermediate location of said one engaging groove.

* * * * *